(12) United States Patent
Li (10) Patent No.: US 11,594,736 B2
(45) Date of Patent: Feb. 28, 2023

(54) SOLID OXIDE FUEL CELL AND MANUFACTURING METHOD OF THE SAME (71) Applicant: TAIYO YUDEN CO., LTD., Tokyo (JP)

(72) Inventor: Xinyu Li, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/144,892

(22) Filed: Jan. 8, 2021

(65) Prior Publication Data
US 2021/0288333 A1 Sep. 16, 2021

(30) Foreign Application Priority Data

Mar. 10, 2020 (JP) .............................. JP2020-040847

(51) Int. Cl.
*H01M 4/90* (2006.01)
*H01M 4/86* (2006.01)
*H01M 4/88* (2006.01)

(52) U.S. Cl.
CPC ....... *H01M 4/8652* (2013.01); *H01M 4/8605* (2013.01); *H01M 4/8657* (2013.01); (Continued)

(58) Field of Classification Search
CPC . H01M 2004/8684; H01M 2300/0074; H01M 4/8605; H01M 4/8652; H01M 4/8657; H01M 4/8663; H01M 4/8803; H01M 4/8807; H01M 4/8889; H01M 4/9033; H01M 4/9066; H01M 8/0232; H01M 8/0236; H01M 8/0245; H01M 8/1246; Y02E 60/50; Y02P 70/50
See application file for complete search history.

(56) References Cited

U.S. PATENT DOCUMENTS

| | | | |
|---|---|---|---|
| 2008/0090127 A1 | 4/2008 | Gorte | 429/535 |
| 2009/0061279 A1 | 3/2009 | Larsen | 429/410 |

(Continued)

FOREIGN PATENT DOCUMENTS

| | | |
|---|---|---|
| JP | 2009-541955 A | 11/2009 |
| JP | 2012-033418 A | 2/2012 |

(Continued)

OTHER PUBLICATIONS

Fabbri, Emiliana, et al. "Electrode materials: a challenge for the exploitation of protonic solid oxide fuel cells." Science and technology of advanced materials (2010) (Year: 2010).

(Continued)

*Primary Examiner* — Victoria H Lynch
(74) *Attorney, Agent, or Firm* — Stein IP, LLC (57) ABSTRACT

A solid oxide fuel cell includes a support of which a main component is a metal, a mixed layer that is provided on the support and includes a metallic material and a ceramics material, an intermediate layer that is provided on the mixed layer and includes an electron conductive ceramics material, and an anode that is provided on the intermediate layer and includes an oxygen ion conductive ceramics material and Ni. A ratio of a metal component in the intermediate layer is smaller than a ratio of the metallic material in the mixed layer.

15 Claims, 5 Drawing Sheets (52) U.S. Cl.
CPC ....... *H01M 4/8663* (2013.01); *H01M 4/8803* (2013.01); *H01M 4/8889* (2013.01); *H01M 4/9033* (2013.01); *H01M 4/9066* (2013.01); *H01M 2300/0074* (2013.01)

(56) References Cited

U.S. PATENT DOCUMENTS

| | | |
|---|---|---|
| 2010/0028757 A1 | 2/2010 | Fu et al. ............ 429/40 |
| 2010/0178589 A1 | 7/2010 | Kwon ............ 429/535 |
| 2012/0003565 A1 | 1/2012 | Son ............ 429/496 |
| 2013/0224628 A1 | 8/2013 | Moon ............ 429/479 |
| 2019/0296385 A1* | 9/2019 | Sugihara ............ H01M 8/2475 |

FOREIGN PATENT DOCUMENTS

| | | |
|---|---|---|
| JP | 2016-115506 A | 6/2016 |
| JP | 2018-055946 A | 4/2018 |
| JP | WO 2019/159276 A1 | 8/2019 |

OTHER PUBLICATIONS

Ju, Young-Wan, et al. "New buffer layer material La (Pr) CrO3 for intermediate temperature solid oxide fuel cell using LaGaO3-based electrolyte film." Journal of Materials Research 27 (2012): 1906-1914 (Year: 2012).

Vert, Vicente B., et al. "Redox stability and electrochemical study of nickel doped chromites as anodes for H2/CH4-fueled solid oxide fuel cells." Applied Catalysis B: Environmental 115 (2012): 346-356. (Year: 2012).

Oh, Tae-Sik, et al. "Infiltrated lanthanum strontium chromite anodes for solid oxide fuel cells: Structural and catalytic aspects."Journal of Power Sources 262 (2014): 207-212 (Year: 2014).

Yan, Yan, et al. "Fabrication of reactive element oxide coatings on porous ferritic stainless steel for use in metal-supported solid oxide fuel cells." Surface and Coatings Technology 272 (2015): 415-427 (Year: 2015).

Huang, B., et al. "Characterization of a Cu-La0. 75Sr0. 25Cr0. 5Mn0. 5O3—CeO2/La0. 75Sr0. 25Cr0. 5Mn0. 5O3—YSZ/Ni-ScSZ three-layer structure anode in thin film solid oxide fuel cell running on methane fuel." Fuel Cells 15 (2015): 398-407. (Year: 2015).

Wasilewski, Eric, et al. "Cu/LaCrO3 joining by local melt infiltration through laser cladding." Journal of the American Ceramic Society 101 (2018): 4472-4479. (Year: 2018).

Final Office Action dated Dec. 19, 2022 in related U.S. Appl. No. 17/031,666.

Fan, W., et al., "Improved properties of scandia and yttria co-doped zirconia as a potential thermal barrier material for high temperature applications", Journal of the European Ceramic Society 38. 13 (2018): 4502-4511.

Gupta, Sapna, Manoj K. Mahapatra, and Prabhakar Singh, "Lanthanum chromite based perovskites for oxygen transport membrane", Materials Science and Engineering: R: Reports 90 (2015): 1-36.

Gao, Zhan, et al., "A perspective on low-temperature solid oxide fuel cells", Energy & Environmental Science 9.5 (2016): 1602-1644.

\* cited by examiner

SOLID OXIDE FUEL CELL AND MANUFACTURING METHOD OF THE SAME

CROSS-REFERENCE TO RELATED APPLICATION

This application is based upon and claims the benefit of priority of the prior Japanese Patent Application No. 2020-040847, filed on Mar. 10, 2020, the entire contents of which are incorporated herein by reference.

FIELD

A certain aspect of the present embodiments relates to a solid oxide fuel cell and a manufacturing method of the same.

BACKGROUND

Recently, it is requested to develop cells which are resistant to vibration and do not crack in a rapid temperature rising, in order to develop solid oxide fuel cells which can be used for automobiles. And so, a solid oxide fuel cell which is supported by a metal member is being developed (for example, see Japanese Patent Application Publication No. 2016-115506 and International Publication No. 2019/159276).

SUMMARY

It is thought that an anode of a solid oxide fuel cell of a metal support type includes a ceramics material and a metallic material in order to improve adhesion between a metallic support and the anode. As a metallic material of the anode, Ni or Ni alloy is used in order to obtain catalytic activity. However, when the solid oxide fuel cell is fired in a reductive atmosphere in order to prevent oxidizing of the metallic support, the Ni component of the anode makes an alloy with the metallic support. When a ratio of Ni in alloy grains is 50% or less, the anode catalytic activity may be degraded.

According to an aspect of the present embodiments, there is provided a solid oxide fuel cell including: a support of which a main component is a metal; a mixed layer that is provided on the support and includes a metallic material and a ceramics material; an intermediate layer that is provided on the mixed layer and includes an electron conductive ceramics material; and an anode that is provided on the intermediate layer and includes an oxygen ion conductive ceramics material and Ni, wherein a ratio of a metal component in the intermediate layer is smaller than a ratio of the metallic material in the mixed layer.

According to another aspect of the present embodiments, there is provided a manufacturing method of a solid oxide fuel cell, the manufacturing method including: preparing a multilayer structure in which a support green sheet, a mixed layer green sheet, an intermediate layer green sheet and an anode green sheet are stacked, the support green sheet including metallic material powder, the mixed layer green sheet including metallic material powder and a ceramics material, the intermediate layer green sheet including electron conductive ceramics powder, the anode green sheet including oxygen ion conductive ceramics powder and Ni component powder; and firing the multilayer structure, wherein the intermediate layer green sheet does not include a non-oxidized metal component, or a ratio of a non-oxidized metal component in the intermediate layer green sheet is less than a ratio of a non-oxidized metal component in the mixed layer green sheet.

DETAILED DESCRIPTION

Hereinafter, an embodiment will be described with reference to the accompanying drawings.

Figure 1:
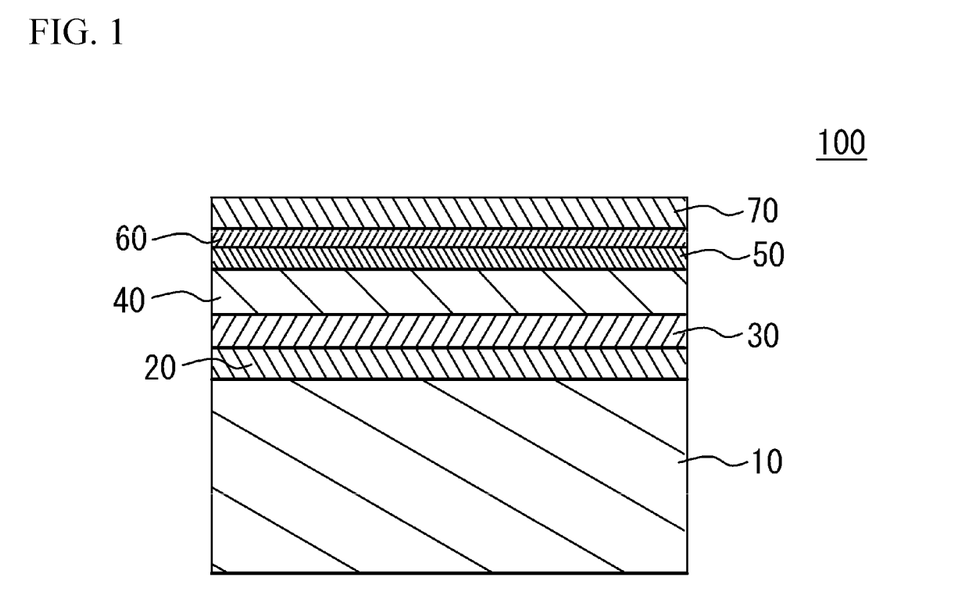
FIG. 1 is a schematic cross-sectional view of a multilayer structure of a fuel cell.

FIG. 1 is a schematic cross-sectional view of a stacking structure of a solid oxide fuel cell 100. As illustrated in FIG. 1, the fuel cell 100 has, as an example, a structure in which a mixed layer 20, an intermediate layer 30, an anode 40, an electrolyte layer 50, a reaction prevention layer 60, and a cathode 70 are stacked on a support 10 in this order. A plurality of the fuel cells 100 may be stacked to structure a fuel cell stack.

The electrolyte layer 50 is a dense layer that is mainly composed of solid oxide having oxygen ion conductivity and has gas impermeability. The electrolyte layer 50 is preferably mainly composed of such as scandia yttria stabilized zirconium oxide (ScYSZ), YSZ (yttria stabilized zirconium oxide), GDC (Gd-doped ceria) in which $CeO_2$ is doped with Gd (gadolinium), or the like. The oxygen ion conductivity is the highest when the concentration of $Y_2O_3 + Sc_2O_3$ is 6 mol % to 15 mol %, when ScYSZ is used. Thus, use of a material having this composition is preferable. The thickness of the electrolyte layer 50 is preferably 20 μm or less, further preferably 10 μm or less. The thinner electrolyte layer is better. However, to prevent gas at the upper face side and gas at the lower face side from leaking, the thickness is preferably 1 μm or greater.

The cathode 70 is an electrode having electrode activity as a cathode, and has electron conductivity and oxygen ion conductivity. For example, the cathode 70 is lanthanum strontium cobaltite (LCS) having electron conductivity and oxygen ion conductivity. LSC is $LaCoO_3$ doped with strontium (Sr).

The reaction prevention layer 60 is mainly composed of a component that prevents reaction between the electrolyte layer 50 and the cathode 70. For example, the reaction prevention layer 60 is mainly composed of GDC (for example, $Ce_{0.8}Gd_{0.2}O_{2-x}$). As an example, when the electrolyte layer 50 contains ScYSZ and the cathode 70 contains LSC, the reaction prevention layer 60 prevents the following reactions.

Figure 2:
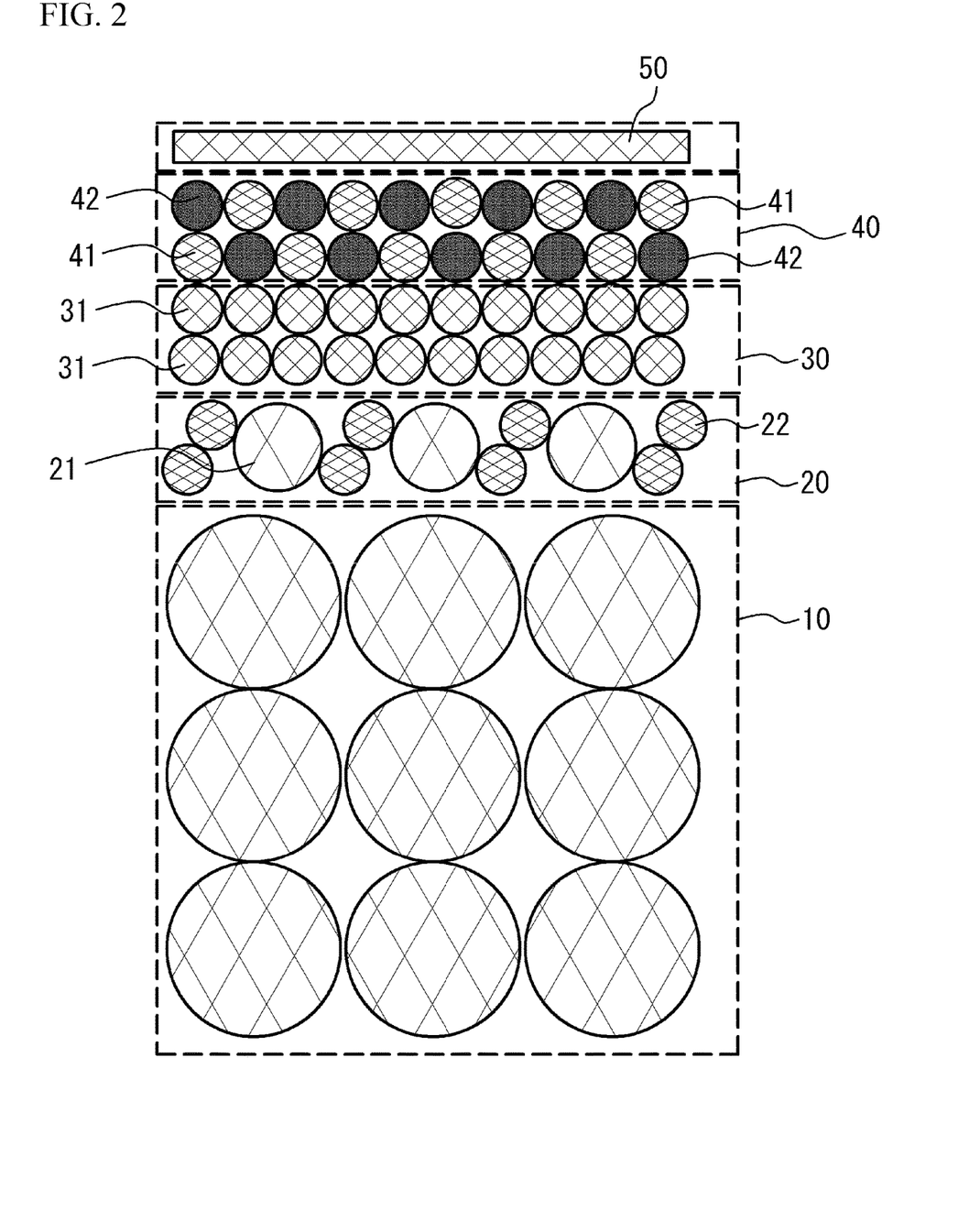
FIG. 2 is an enlarged cross-sectional view of details of a support, a mixed layer, an intermediate layer and an anode.

FIG. 2 is an enlarged cross-sectional view illustrating details of the support 10, the mixed layer 20, the intermediate layer 30 and the anode 40. As illustrated in FIG. 2, the support 10 is a member that has gas permeability and is able to support the mixed layer 20, the intermediate layer 30, the anode 40, the electrolyte layer 50, the reaction prevention layer 60, and the cathode 70. The support 10 is a porous metallic material of which a main component is a metallic material, and is, for example, a porous material of Fe—Cr alloys.

The anode 40 is porous electrode having electrode activity as an anode, and includes an oxygen ion conductive ceramics 41 and a Ni component 42. The Ni component 42 may be a metal Ni or an oxide such as NiO. NiO is reduced by hydrogen gas during usage of the fuel cell 100. Therefore, NiO is converted into a metal Ni during usage of the fuel cell 100. The metal Ni has electron conductivity and acts as an anode catalyst.

The mixed layer 20 contains a metallic material 21 and a ceramics material 22. In the mixed layer 20, the metallic material 21 and the ceramics material 22 are randomly mixed. Thus, a structure in which a layer of the metallic material 21 and a layer of the ceramics material 22 are stacked is not formed. Also in the mixed layer 20, a plurality of pores is formed. The metallic material 21 is not particularly limited as long as the metallic material 21 is a metal. In the example of FIG. 2, a metallic material identical to the metallic material of the support 10 is used as the metallic material 21. For example, ScYSZ, GDC, a $SrTiO_3$-based material, or a $LaCrO_3$-based material can be used as the ceramics material 22. Since the $SrTiO_3$-based material and the $LaCrO_3$-based material have high electron conductivity, the ohmic resistance in the mixed layer 20 can be reduced. It is preferable that the same oxide of the electron conductive ceramics 31 is used as the ceramics material 22.

When the support 10, the mixed layer 20 and the anode 40 are fired in a reductive atmosphere in order to prevent oxidizing of the support 10, the Ni component 42 of the anode 40 is reduced into a metal Ni and the metal Ni makes an alloy with the metallic material 21 of the mixed layer 20. In this case, the anode catalytic activity of the anode 40 may be degraded, and the reaction resistance of the anode 40 may get larger. When a difference between a thermal expansion coefficient of the alloy and a thermal expansion coefficient of other layers is large, crack may occur.

And so, in the embodiment, the intermediate layer 30 is provided. The intermediate layer 30 is provided in order to suppress alloying between the Ni component 42 of the anode 40 and the metallic material 21 of the mixed layer 20. However, the intermediate layer 30 has electron conductivity. And so, the intermediate layer 30 includes an electron conductive ceramics 31. As one example, the electron conductive ceramics 31 may be a perovskite oxide expressed by a composition formula $ABO_3$, in which an A site is at least one element selected from a group of Ca, Sr, Ba and La, and a B site is at least one element selected from a group of Ti and Cr. The molar ratio of the B site may be equal to or more than the molar ratio of the A site. In concrete, the electron conductive ceramics 31 is such as a $LaCrO_3$-based material or a $SrTiO_3$-based material.

The intermediate layer 30 is provided in order to suppress alloying of the Ni component 42 of the anode 40. It is therefore preferable that the intermediate layer 30 includes a metal component which is not oxidized. When the intermediate layer 30 incudes the metal component which is not oxidized, it is preferable that a ratio of the metal component in the intermediate layer 30 is 3 wt % or less by a SEM-EDS quantitative analysis of a cross section. When the ratio of the metal component in the intermediate layer 30 is smaller than the ratio of the metallic material 21 in the mixed layer 20, it is possible to suppress the alloying of the Ni component 42, compared to a case where the intermediate layer 30 is not provided.

A graph of X-ray spectrum of each element is obtained in a SEM-EDS quantitative analysis of a cross section. From an area of each element of the spectrum graph, a weight ratio of each element is obtained. A ratio of a metal component of the intermediate layer 30 is defined as the following.

A metal amount (%)={a total weight of each metal element (of a case of alloy)}/{a total weight of each element of a ceramics material+a total weight of each metal element}

The total weight of each metal element is, for example, defined as a weight of Fe+a weight of Cr and a weight of other elements. The total weight of each element of the ceramics material is, for example, defined as a weight of La+a weight of Cr+a weight of Sr+a weight of Ti and a weight of other elements.

The fuel cell 100 generates power by the following actions. An oxidant gas containing oxygen, such as air, is supplied to the cathode 70. At the cathode 70, oxygen reaching the cathode 70 reacts with electrons supplied from an external electric circuit to become oxygen ions. The oxygen ions conduct through the electrolyte layer 50 to move to the anode 40 side. On the other hand, a fuel gas containing hydrogen, such as a hydrogen gas or a reformed gas, is supplied to the support 10. The fuel gas reaches the anode 40 through the support 10, the mixed layer 20 and the intermediate layer 30. Hydrogen reaching the anode 40 release electrons at the anode 40 and reacts with oxygen ions conducting through the electrolyte layer 50 from the cathode 70 side to become water ($H_2O$). The released electrons are drawn out to the outside by the external electric circuit. The electrons drawn out to the outside are supplied to the cathode 70 after doing electric work. Through the above-described actions, electric power is generated.

In the above-described power generation reaction, the metal Ni obtained by the reduction of the Ni component 42 acts as a catalyst in the reaction between hydrogen and oxygen ions. The electron conductive ceramics 31 conducts electrons obtained by the reaction between hydrogen and oxygen ions.

The fuel cell 100 of the embodiment has the support 10 of which the main component is a metal. Therefore, the fuel cell 100 has resistance against thermal shock, mechanical shock and so on. Since the mixed layer 20 contains the metallic material 21 and the ceramics material 22, the mixed layer 20 has material properties of metal and material properties of ceramic. Thus, the mixed layer 20 has high adhesiveness with the support 10 and high adhesiveness with the intermediate layer 30. Therefore, interlayer peeling between the support 10 and the anode 40 can be inhibited. As mentioned above, the intermediate layer 30 includes the electron conductive ceramics 31, and the ratio of the metal component in the intermediate layer 30 is less than the ratio of the metallic material 21 in the mixed layer 20. Therefore, the alloying of the Ni component 42 in the anode 40 is suppressed. And the electron conductivity is secured. It is possible to suppress the degradation of the catalytic activity of the Ni component 42, because the alloying of the Ni component 42 is suppressed.

When the porosity of the intermediate layer 30 is small, sufficient gas permeability may not be necessarily achieved in the intermediate layer 30. And so, it is preferable that the porosity of the intermediate layer 30 has a lower limit. In the embodiment, it is preferable that the porosity of the intermediate layer 30 is 10% or more. It is more preferable that the porosity of the intermediate layer 30 is 30% or more. It is still more preferable that the porosity of the intermediate layer 30 is 50% or more. With use of a SEM image of a cross section of a sample (for example, FIG. 3), five or more images are taken with a magnification such that a thickness of a whole of the intermediate layer can be confirmed. The porosity is an average value of ratios of areas of the pores with respect to a whole area of the images which are estimated from the images.

Figure 3:
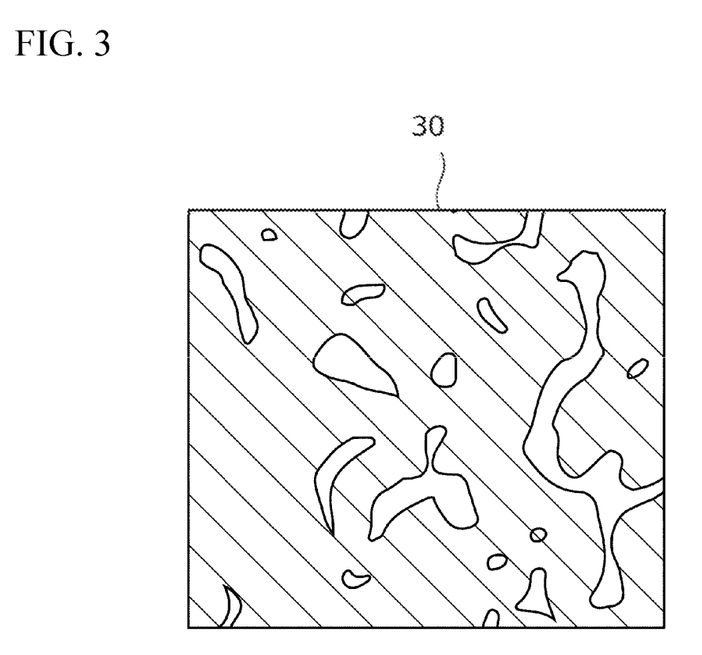
FIG. 3 is a schematic SEM image.

When the porosity of the intermediate layer 30 is large, the structure of the intermediate layer 30 may collapse and the fuel cell 100 may be broken. It is therefore preferable that the porosity of the intermediate layer 30 has an upper limit. In the embodiment, it is preferable that the porosity of the intermediate layer 30 is 80% or less. It is more preferable that the porosity of the intermediate layer 30 is 70% or less. It is still more preferable that the porosity of the intermediate layer 30 is 65% or less.

When the ratio of the electron conductive ceramics 31 in the intermediate layer 30 is small, sufficient electron conductivity may not be necessarily achieved. And so, it is preferable that the ratio of the electron conductive ceramics 31 in the intermediate layer 30 has a lower limit. In the embodiment, it is preferable that an area ratio of the electron conductive ceramics 31 in the cross section of the intermediate layer 30 in the stacking direction is 20% or more. It is more preferable that the area ratio is 30% or more. It is still more preferable that the area ratio is 50% or more.

When the intermediate layer 30 is thin, a metal grain (a few μm) of the mixed layer 20 may break the intermediate layer 30 during stacking and may contact the Ni grains of the anode 40. When the metal grain contacts the Ni grains, a path for element diffusion is formed and alloying may be accelerated. And so, it is preferable that the thickness of the intermediate layer 30 has a lower limit. For example, it is preferable that the thickness of the intermediate layer 30 is 1 μm or more. It is more preferable that the thickness is 5 μm or more. It is still more preferable that the thickness is 10 μm or more.

Additionally, the porosity in the support 10, the porosity in the mixed layer 20, the porosity of the intermediate layer 30 and the porosity in the anode 40 preferably have a relationship of the porosity in the support 10>the porosity in the mixed layer 20≥the porosity of the intermediate layer 30>the porosity in the anode 40. This relationship allows the support 10 to have sufficient gas permeability. Since the anode 40 has a comparatively low porosity, the anode 40 obtains high electron conductivity and high oxygen ion conductivity while maintaining gas permeability. The mixed layer 20 obtains gas permeability and the contact area with the support 10 is obtained. Thus, the mixed layer 20 obtains the adhesion with the support 10. The intermediate layer 30 achieves gas permeability and suppresses contact between the Ni and the metal grains.

Figure 4:
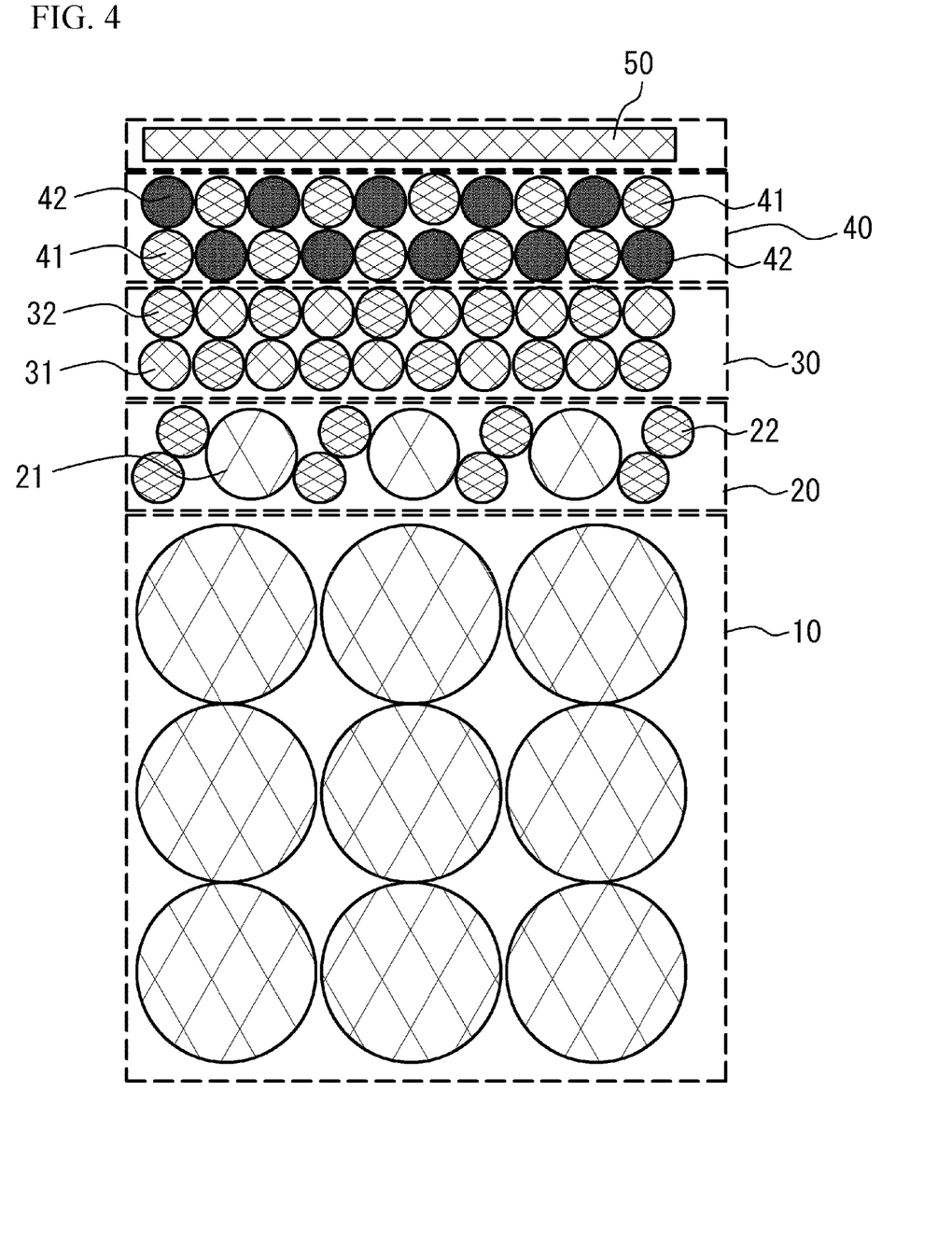
FIG. 4 is another enlarged cross-sectional view of details of a support, a mixed layer, an intermediate layer and an anode.

When the intermediate layer 30 includes an oxygen ion conductive ceramics 32 having the same composition as the oxygen ion conductive ceramics of the anode 40 as illustrated in FIG. 4, the adhesion between the intermediate layer 30 and the anode 40 is improved. It is therefore preferable that the intermediate layer 30 includes the oxygen ion conductive ceramics of the anode 40.

Figure 5:
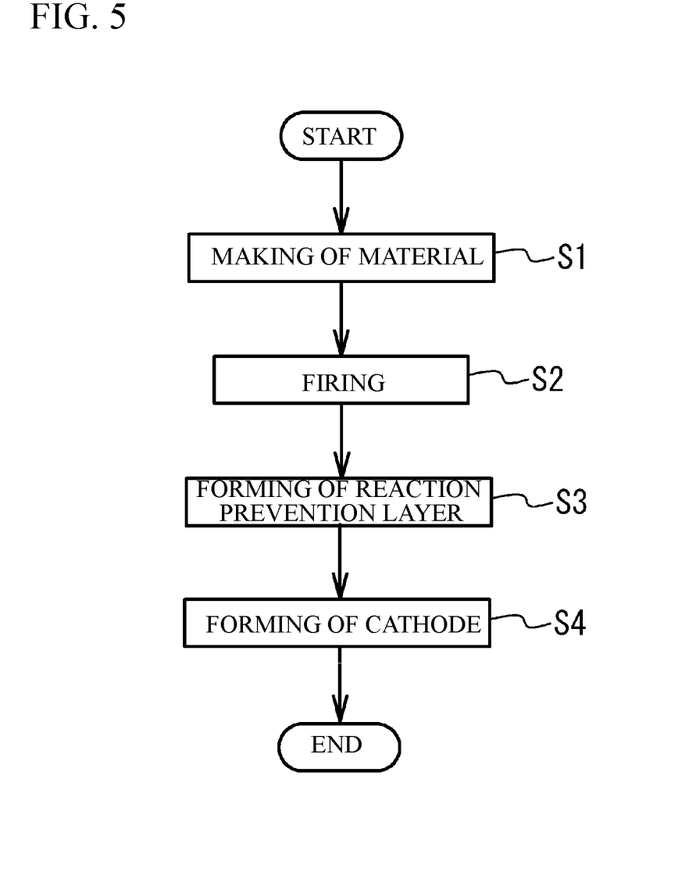
FIG. 5 is a flowchart of the manufacturing method of a fuel cell.

Hereinafter, a manufacturing method of the fuel cell 100 will be described. FIG. 5 is a flowchart of the manufacturing method of the fuel cell 100.

Making Process of Material for Support

Metallic powder having a particle size of, for example, 10 μm to 100 μm, a plasticizer, a solvent, a vanishing material, and a binder are mixed to make slurry as a material for support. The amount of the plasticizer is adjusted to, for example, 1 wt % to 6 wt % to adjust the adhesiveness of the sheet. The solvent is toluene, 2-propanol (IPA), 1-butanol, terpineol, butyl acetate, ethanol, or the like. The amount of the solvent is 20 wt % to 30 wt % depending on the viscosity or the like. The vanishing material is an organic substance. The binder is PVB, acrylic resin, ethyl cellulose, or the like. The material for support is used as a material for forming the support 10. The ratio of the volume of the organic components (the vanishing material, the solid component of the binder, and the plasticizer) to the volume of the metallic powder is within a range of, for example, 1:1 to 20:1. The amount of the organic components is adjusted depending on the porosity.

Making Process of Material for Mixed Layer

Ceramics material powder, which is the raw material of the ceramics material 22, metallic material powder having a small particle size, which is the raw material of the metallic material 21, a solvent, a plasticizer, a vanishing material and a binder are mixed to make slurry as a material for mixed layer. The ceramics material powder has a particle size of, for example, 100 nm to 10 μm. The metallic material powder has a particle size of, for example, 1 μm to 10 μm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The vanishing material is an organic substance. The binder is PVB, acrylic resin, ethyl cellulose, or the like. The ratio of the volume of the organic components (the vanishing material, the solid component of the binder, and the plasticizer) to the volume of the ceramics material powder and the metallic material powder is within a range of, for example, 1:1 to 5:1. The amount of the organic components is adjusted depending on the porosity. The diameter of the pore is controlled by adjusting the particle size of the vanishing material. The ceramics material powder may contain powder of an electron conductive material and powder of an oxygen ion conductive material. In this case, the ratio of the volume of the powder of the electron conductive material to the volume of the powder of the oxygen ion conductive material is preferably within a range of, for example, 1:9 to 9:1. Use of an electrolyte material such as ScYSZ, GDC, or the like instead of the electron conductive material also prevents the peeling of the boundary face and enables the manufacture of the cell. However, to reduce the ohmic resistance, it is preferable to mix an electron conductive material and metallic powder.

Making Process of Material for Intermediate Layer

Ceramics material powder, a solvent, a plasticizer, a vanishing material, and a binder are mixed to make slurry as a material for intermediate layer. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. Powder of the electron conductive material that is the raw material of the electron conductive ceramics 31 and has a particle size of, for example, 100 nm to 10 μm and powder of the oxygen ion conductive material and has a particle size of, for example, 100 nm to 10 μm may be used as the ceramics material powder structuring the alloying prevention layer. The ratio of the volume of the organic components (the vanishing material, the solid component of the binder, and the plasticizer) to the volume of the powder of the electron conductive material is within a range of, for example, 1:1 to 5:1, and the amount of the organic components is adjusted depending on the porosity. Additionally, the diameter of the pore is controlled by adjusting the particle size of the vanishing material. The ratio of the volume of the powder of the electron conductive material to the volume of the powder of the oxygen ion conductive material is within a range of, for example, 3:7 to 7:3.

The intermediate layer 30 is provided to suppress alloying of the Ni component 42 of the anode 40. It is therefore preferable that the material for intermediate layer includes a non-oxidized metal component. When the material for intermediate layer includes the non-oxidized metal component, a ratio of the non-oxidized metal component in the material for intermediate layer is 3 wt % or less. When the ratio of the metal component in the material for intermediate layer is smaller than a ratio of a metal component in the material for mixed layer, it is possible to suppress the alloying of the Ni component 42, compared to a case where the intermediate layer 30 is not provided.

Making Process of Material for Anode

Ni metallic powder or NiO powder, oxygen ion conductive material powder (ScYSZ), a solvent, a plasticizer, a vanishing material, and a binder are mixed to make slurry as a material for anode. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to, for example, 1 wt % to 6 wt % to adjust the adhesiveness of the sheet. The vanishing material is an organic substance. The binder is PVB, acrylic resin, ethyl cellulose, or the like. The Ni raw material may be the Ni metallic powder or the NiO powder. The Ni raw material has a particle size of, for example, 100 nm to 10 μm. The Ni raw material is reduced into metallic Ni during the firing in a reductive atmosphere. Therefore, the Ni raw material is not limited. The oxygen ion conductive material powder is such as ScYSZ powder and has a particle size of 100 nm to 10 μm. The ratio of the volume of the organic components (the vanishing material, the solid component of the binder, and the plasticizer) to the volume of the powder of the oxygen ion conductive material powder is within a range of, for example, 1:1 to 5:1, and the amount of the organic components is adjusted depending on the porosity. Additionally, the diameter of the pore is controlled by adjusting the particle size of the vanishing material. The ratio of the volume of the Ni (NiO) powder to the volume of the powder of the oxygen ion conductive material is within a range of, for example, 3:7 to 7:3.

Making Process of Material for Electrolyte Layer

Powder of an oxygen-ion conductive material, a solvent, a plasticizer, and a binder are mixed to make slurry as a material for electrolyte layer. The powder of the oxygen-ion conductive material is, for example, ScYSZ, YSZ, GDC, or the like, and has a particle size of 10 nm to 1000 nm. The solvent is toluene, 2-propanol (IPA), 1-butanol, terpineol, butyl acetate, ethanol, or the like. The amount of the solvent is 20 wt % to 30 wt % depending on the viscosity. The amount of the plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder and the plasticizer) to the volume of the powder of the oxygen ion conductive material is within a range of, for example, 6:4 to 3:4.

Making Process of Material for Cathode

Powder of lanthanum strontium cobaltite (LSC: LaSrCoO$_3$), a solvent, a plasticizer, and a binder are mixed to make slurry as a material for cathode. The solvent is toluene, 2-propanol (IPA), 1-butanol, terpineol, butyl acetate, ethanol, or the like, and the amount of the solvent is 20 wt % to 30 wt % depending on the viscosity. The plasticizer is adjusted to 1 wt % to 6 wt % to adjust the adhesiveness of the sheet. The binder is PVB, acrylic resin, ethyl cellulose, or the like. The ratio of the volume of the organic components (the solid component of the binder, the plasticizer) to the volume of LSC powder is within a range of, for example, 6:4 to 1:4.

Firing Process

A support green sheet is made by applying the material for support on a polyethylene terephthalate (PET) film. A mixed layer green sheet is made by applying the material for mixed layer on another PET film. An intermediate layer green sheet is made by applying the material for intermediate layer on another PET film. An anode green sheet is made by applying the material for anode on yet another PET film. An electrolyte layer green sheet is made by applying the material for electrolyte layer on yet another PET film. For example, several support green sheets, one mixed layer green sheet, one intermediate layer green sheet, one anode green sheet, and one electrolyte layer green sheet are stacked in this order, cut into a predetermined size, and fired within a temperature range of approximately 1100° C. to 1300° C. in a reductive atmosphere with an oxygen partial pressure of $10^{-20}$ atm or less. Through the above process, a half cell including the support 10, the mixed layer 20, the intermediate layer 30, the anode 40, and the electrolyte layer 50 is obtained.

Forming Process of Reaction Preventing Layer

As the reaction prevention layer 60, $Ce_{0.8}Gd_{0.2}O_{2-x}$ is formed so as to have a thickness of 1 μm by, for example, PVD.

Forming Process of Cathode

Next, the material for cathode is applied on the reaction prevention layer 60 by screen printing and is then dried. Then, the cathode 70 is sintered by heat treatment. Through the above process, the fuel cell 100 can be fabricated.

In the manufacturing method, the support 10 of which the main component is a metal is formed. Therefore, the fuel cell 100 has resistance against thermal shock, mechanical shock and so on. Since the material for mixed layer contains the metallic material and the ceramics material, the mixed layer 20 after the firing includes the metallic material 21 and the ceramics material 22. Therefore, the mixed layer 20 has material properties of metal and material properties of ceramic. Therefore, interlayer peeling between the support 10 and the anode 40 can be inhibited. The material for intermediate layer includes the electron conductive ceramics, and the ratio of the metal component in the material for intermediate layer is less than the ratio of the metallic material in the material for mixed layer. Therefore, the alloying of the Ni component in the material for anode is suppressed. And the electron conductivity is secured.

EXAMPLES

The fuel cell 100 was fabricated according to the manufacturing method in accordance with the above embodiment.

Example 1

The cathode 70, the reaction prevention layer 60, the electrolyte layer 50, the anode 40, the intermediate layer 30, the mixed layer 20 and the support 10 were stacked from the upper side. Thus, the fuel cell 100 was made. The intermediate layer 30 was made of only LaSrCrO$_3$. The fuel cell 100 generated electrical power. Impedance of each of the fuel cell 100 was measured to separate the resistance value to measure the ohmic resistance of the fuel cell 100. The ohmic resistance was 0.25 Ω·cm². The reaction resistance of the anode 40 was 0.1 Ω·cm². Table 1 shows the results. The cross section was observed. The alloying of Ni of the anode 40 was suppressed. The amount of Ni in the metal grains (the peak area ratio of Ni with respect to the metal component which was calculated by analyzing one alloy grain with use of SEM-EDS) was 60% or more. It is thought that this was because the intermediate layer 30 did not include the non-oxidized metal component. It is thought the sufficient anode catalytic activity was achieved, and the reaction resistance of the anode 40 was reduced. In the following example 2, the ohmic resistance was small. It is thought that this was because the intermediate layer 30 was made of on the electron conductive ceramics, and the intermediate layer 30 has high electron conductivity.

TABLE 1

| | INTERMEDIATE LAYER | | | | |
|---|---|---|---|---|---|
| | MIXED LAYER | ELECTRON CONDUCTIVE CERAMICS | OXYGEN ION CONDUCTIVE CERAMICS | OHMIC RESISTANCE (Ω · cm²) | REACTION RESISTANCE (Ω · cm²) |
| EXAMPLE 1 | YES | YES | NO | 0.25 | 0.1 |
| EXAMPLE 2 | YES | YES | YES | 0.28 | 0.1 |
| COMPARATIVE EXAMPLE 1 | YES | — | — | 0.25 | 20 |
| COMPARATIVE EXAMPLE 2 | NO | — | — | — | — |

Example 2

The cathode 70, the reaction prevention layer 60, the electrolyte layer 50, the anode 40, the intermediate layer 30, the mixed layer 20 and the support 10 were stacked from the upper side. Thus, the fuel cell 100 was made. The intermediate layer 30 was made of LaSrCrO₃ and ScYSZ. The cross section of the intermediate layer 30 was observed by SEM-EDS. The area ratio of LaSrCrO₃ and ScYSZ was 1:1. The fuel cell 100 generated electrical power. Impedance of each of the fuel cell 100 was measured to separate the resistance value to measure the ohmic resistance of the fuel cell 100. The ohmic resistance was 0.28 Ω·cm². The reaction resistance of the anode 40 was 0.1 Ω·cm². The cross section was observed. The alloying of Ni of the anode 40 was suppressed. The amount of Ni in the metal grains was 60% or more. It is thought that this was because the intermediate layer 30 did not include the non-oxidized metal component. It is thought the sufficient anode catalytic activity was achieved, and the reaction resistance of the anode 40 was reduced.

Comparative Example 1

The cathode 70, the reaction prevention layer 60, the electrolyte layer 50, the anode 40, the mixed layer 20 and the support 10 were stacked from the upper side. Thus, the fuel cell 100 was made. The intermediate layer 30 was not formed. The fuel cell 100 generated electrical power. Impedance of each of the fuel cell 100 was measured to separate the resistance value to measure the ohmic resistance of the fuel cell 100. The ohmic resistance was 0.25 Ω·cm². The reaction resistance of the anode 40 was 20 Ω·cm². The reaction resistance of the anode 40 was much larger than that of the example 1. The cross section was observed. The alloying of Ni of the anode 40 was promoted. The amount of Ni in the metal grains was 35% or less. It is thought that this was because the intermediate layer 30 was not formed. It is thought the anode catalytic activity was degraded because the amount of Ni was small. And it is thought that the reaction resistance of the anode 40 was greatly increased.

Comparative Example 2

The cathode 70, the reaction prevention layer 60, the electrolyte layer 50, the anode 40, and the support 10 were stacked from the upper side. Thus, the fuel cell 100 was made. The intermediate layer was not formed. In addition, the mixed layer 20 was not formed. The alloying of Ni of the anode 40 was promoted more than the comparative example 1. A layer formed of only alloy of which Ni amount was 30% or less was formed in the support 10 on the side of the anode 40 because of mutual diffusion of Ni, Fe and Cr. This was confirmed by SEM-EDS. It is thought that this was because the intermediate layer 30 was not formed. The thermal expansion of the alloy later was largely different from those of other materials. Therefore, remarkable crack occurred in the fuel cell after the firing. The fuel cell 100 was not capable of generating electrical power.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. A solid oxide fuel cell comprising:
   a support of which a main component is a metal;
   a mixed layer that is provided on the support and includes a metallic material and a ceramics material;
   an intermediate layer that is provided on the mixed layer and includes an electron conductive ceramics material; and
   an anode that is provided on the intermediate layer and includes an oxygen ion conductive ceramics material and Ni,
   wherein a ratio of a metal component in the intermediate layer is smaller than a ratio of the metallic material in the mixed layer.

2. The solid oxide fuel cell as claimed in claim 1, wherein the ratio of the metal component in the intermediate layer is 3 wt % or less.

3. The solid oxide fuel cell as claimed in claim 1, wherein a porosity of the intermediate layer is 10% or more.

4. The solid oxide fuel cell as claimed in claim 1, wherein the intermediate layer includes the oxygen ion conductive ceramics material of the anode.

5. The solid oxide fuel cell as claimed in claim 1, wherein an area ratio of the electron conductive ceramics material in a cross section of the intermediate layer is 20% or more.

6. The solid oxide fuel cell as claimed in claim 1, wherein the intermediate layer has a thickness of 1 μm or more.

7. The solid oxide fuel cell as claimed in claim 1, wherein a porosity in the support, a porosity in the mixed layer, a porosity of the intermediate layer and a porosity in the anode have a relationship of the porosity in the support>the porosity in the mixed layer>the porosity in the intermediate layer>the porosity in the anode.

8. The solid oxide fuel cell as claimed in claim 1, wherein the electron conductive ceramics material is a perovskite type oxide expressed by a formula $ABO_3$ in which an A site is at least one element selected from a group of Ca, Sr, Ba or La, and a B site is at least one element selected from a group of Ti or Cr.

9. The solid oxide fuel cell as claimed in claim 1, wherein the intermediate layer does not include a non-oxidized metal component.

10. The solid oxide fuel cell as claimed in claim 1,
wherein the anode does not include an electron conductive ceramics material, and
wherein the intermediate layer does not include an oxygen ion conductive ceramics material.

11. The solid oxide fuel cell as claimed in claim 1, wherein the electron conductive ceramics material is $SrTiO_3$-based material.

12. A manufacturing method of a solid oxide fuel cell, the manufacturing method comprising:

preparing a multilayer structure in which a support green sheet, a mixed layer green sheet, an intermediate layer green sheet and an anode green sheet are stacked, the support green sheet including metallic material powder, the mixed layer green sheet including metallic material powder and a ceramics material, the intermediate layer green sheet including electron conductive ceramics powder, the anode green sheet including oxygen ion conductive ceramics powder and Ni component powder; and firing the multilayer structure,
wherein the intermediate layer green sheet does not include a non-oxidized metal component, or a ratio of a non-oxidized metal component in the intermediate layer green sheet is less than a ratio of a non-oxidized metal component in the mixed layer green sheet.

13. The method as claimed in claim 12, wherein the intermediate layer green sheet does not include the non-oxidized metal component.

14. The method as claimed in claim 12,
wherein the anode green sheet does not include an electron conductive ceramics material, and
wherein the intermediate layer green sheet does not include an oxygen ion conductive ceramics material.

15. The method as claimed in claim 12, wherein the electron conductive ceramics material powder is $SrTiO_3$-based material.

* * * * *